United States Patent [19]
Walker et al.

[11] Patent Number: 6,014,681
[45] Date of Patent: Jan. 11, 2000

[54] METHOD FOR SAVING A DOCUMENT USING A BACKGROUND SAVE THREAD

[75] Inventors: Mark John Walker; Jay Boyer, both of Redmond, Wash.

[73] Assignee: Microsoft Corporation, Redmond, Wash.

[21] Appl. No.: 08/892,636

[22] Filed: Jul. 15, 1997

[51] Int. Cl.[7] .................................................. G06F 17/21
[52] U.S. Cl. ........................................... 707/530; 709/101
[58] Field of Search ..................... 707/530, 500; 709/101, 103

[56] References Cited

U.S. PATENT DOCUMENTS

| | | | |
|---|---|---|---|
| 4,480,308 | 10/1984 | Grafe et al. | 364/200 |
| 4,633,430 | 12/1986 | Cooper | 364/900 |
| 4,897,780 | 1/1990 | Lakness | 364/200 |
| 4,996,662 | 2/1991 | Cooper et al. | 364/900 |
| 5,148,542 | 9/1992 | Sakuma et al. | 395/700 |
| 5,168,566 | 12/1992 | Kuki et al. | 395/650 |
| 5,274,813 | 12/1993 | Itoh | 395/700 |
| 5,442,802 | 8/1995 | Brent et al. | 395/200.08 |
| 5,473,776 | 12/1995 | Nosaki et al. | 395/700 |
| 5,784,616 | 7/1998 | Horvitz | 395/672 |
| 5,857,208 | 1/1999 | Ofek | 707/204 |

OTHER PUBLICATIONS

Alan Simpson, Mastering Wordperfect 5.1 & 5.2 for Windows; Sybex Inc., pp. 453–455, 1993.

Henry Bortman, The State of 8; MacUser, vol. 12, No. 8, p. 69(7), Aug. 1996.

*Primary Examiner*—Stephen S. Hong
*Assistant Examiner*—Robert D. Bourque
*Attorney, Agent, or Firm*—Jones & Askew, LLP

[57] ABSTRACT

Saving a document using a background save thread while editing continues in a foreground thread. When a save is initiated, control is transferred to the background save thread and a document descriptor is cloned. If a foreground event is detected, then control is returned to the foreground thread. If no foreground event has been detected, then the save continues in the background save thread. During the background save, the background save thread checks for a foreground event. If a foreground event is detected, then control is returned to the foreground thread. Once the foreground thread becomes idle, control is returned to the background save thread so that the save may continue. Control is transferred between the foreground thread and the background save thread until the background save is complete.

23 Claims, 4 Drawing Sheets

METHOD FOR SAVING A DOCUMENT USING A BACKGROUND SAVE THREAD

FIELD OF THE INVENTION

This invention relates in general to saving a document while editing the document, and in particular to saving a document in a background save thread while editing the document in a foreground thread.

BACKGROUND OF THE INVENTION

Word processing programs are commonly used to create and edit documents. A document may be saved when the document is closed or when the word processing program is exited. A document may also be saved as it is created or revised. Saving a document as it is created or revised, protects the document in case a power failure or other problem occurs before the document is closed. If the document is saved as it is created or revised, then the document or the revisions may be restored in the event of a problem. The more frequently the document is saved, the more likely the document or the revisions may be fully restored in the event of a problem. If the document is not saved as it is created or revised, then the document or the revisions may be lost if a problem occurs before the document is closed.

A user may save a document by manually selecting the "save" command or in response to a periodic save reminder. A document may also be saved under a different name using the "save as" command. To save the document, a temporary file is created and the document is copied into the temporary file. Saving a document by copying the document into a temporary file is commonly referred to as a full save. After the document data is copied into the temporary file, the temporary file is renamed. If the document save was initiated by a "save" command or in response to a save reminder, then the temporary file is renamed to the document name. If the document save was initiated by a "save as" command, then the temporary file is renamed to the name specified by the "save as" command.

A document may also be saved without user intervention by using an automatic save option. An automatic save is a save which is initiated by the word processing program. The first automatic save is a full save which copies the entire document into an automatic save file. Subsequent automatic saves are incremental saves which append changes to the document since the last automatic save to the end of the automatic save file.

For both command-initiated saves and automatic saves, the user is prevented from editing the document while the document is being saved. Depending upon the size of the document, the save may be very time consuming. If the document is repeatedly saved, then editing is repeatedly interrupted. Because the user is prevented from editing the document while the document is being saved, the user must choose between greater document protection, i.e. saving a document more frequently, or greater efficiency, i.e. saving a document less frequently so that fewer interruptions occur. If the interruption due to a save could be minimized, then a user could save a document more frequently with less interruption.

Accordingly, there is a need in the art for saving a document with a minimum of user interruption.

SUMMARY OF THE INVENTION

The present invention meets the need described above by providing a method for saving a document in a background save thread while allowing editing to continue in a foreground thread. A background save may be used for both command-initiated saves and automatic saves. A command-initiated save is a save initiated via a "save" command or a "save as" command. An automatic save is a save initiated by the word processing program. When a save is initiated, the foreground thread "clones" the document descriptor for the document. The document descriptor is a data structure, defined by the word processing program, which contains a list of references or pointers to the document data stored on disk. After the document descriptor is cloned, editing may continue in the foreground thread. User interruption is minimized because the document descriptor is significantly smaller than the document and the time required to clone the document descriptor is significantly less than the time required to save the document.

The components of a background save system include an editing component, a cloning component, a queue component, a saving component and an arbitrating component. The foreground thread includes the editing component, the cloning component, and the queue component. The background save thread includes the saving component. The foreground thread components interface with the background save thread component through the arbitrating component. A user interfaces with the editing component to create or revise a document. Once a background save is detected, the cloning component clones the document descriptor for the document being saved. The queue component maintains a background save queue of pending background saves. The saving component saves a copy of the document in a temporary file. The arbitrating component monitors the foreground thread and transfers control between the foreground thread and the background save thread.

When a background save is initiated, the foreground thread determines a saved document name for the background save. If the background save was initiated by a "save" command, then the saved document name corresponds to the name of the original document. If the background save was initiated by a "save as" command, then the saved document name corresponds to the name specified by the "save as" command. If the background save was initiated by an automatic save, then the saved document name corresponds to the name of an automatic save file.

The foreground thread clones the document descriptor by creating a copy of the document descriptor in memory. The foreground thread also creates a temporary file. The temporary file is used by the background save thread to save the document. The saved document name is compared to the entries in the background save queue. If the saved document name matches an entry in the background save queue, then the entry in the background save queue is typically deleted. For example, the entry in the background save queue is deleted if both the entry and the saved document name correspond to the same type of save, i.e. a command-initiated save or an automatic save. However, the entry in the background save queue is not deleted if the entry corresponds to a background save which is in progress or the entry corresponds to a command-initiated save and the background save corresponds to an automatic save. A new background save queue entry is created for the background save and is added to the background save queue.

The background save thread retrieves an entry from the background save queue. The cloned document descriptor corresponding to the entry is used to copy the document into the temporary file. Once the document copy is complete, then the temporary file is renamed to the saved document name and the corresponding entry in the background save queue is deleted. If there are pending background saves in the background save queue and no foreground event has been detected, then the background save thread retrieves another entry from the background save queue. However, if a foreground event has been detected or if the background save queue is empty, then editing continues in the foreground thread.

While the save is proceeding in the background save thread, the foreground thread is monitored to determine whether a foreground event has occurred. If a foreground event is detected, then control is returned to the foreground thread. If no foreground event is detected, then the save continues in the background save thread. If control is returned to the foreground thread during a background save, then the foreground thread retains control so long as the foreground thread is active. Once the foreground thread becomes idle, then control is returned to the background save thread and the save continues. The use of a background save thread allows a user to continue editing a document in the foreground thread while the document is saved in the background save thread.

DETAILED DESCRIPTION

The present invention is directed to saving a document in a background save thread while allowing a user to continue to edit the document in a foreground thread. In one embodiment, the invention is incorporated into a word processing application program entitled "WORD", marketed by Microsoft Corporation of Redmond, Wash. Briefly described, the foreground thread clones the document descriptor for the document and then returns control to the user. The document descriptor is much smaller than the document and is stored in memory, so cloning the document descriptor is much faster than copying the document from disk. By cloning the document descriptor and then returning control to the user, editing may continue with only a short interruption. After the document descriptor is cloned, the save proceeds in the background save thread whenever the foreground thread is idle until the background save is complete.

Exemplary Operating Environment

Figure 1:
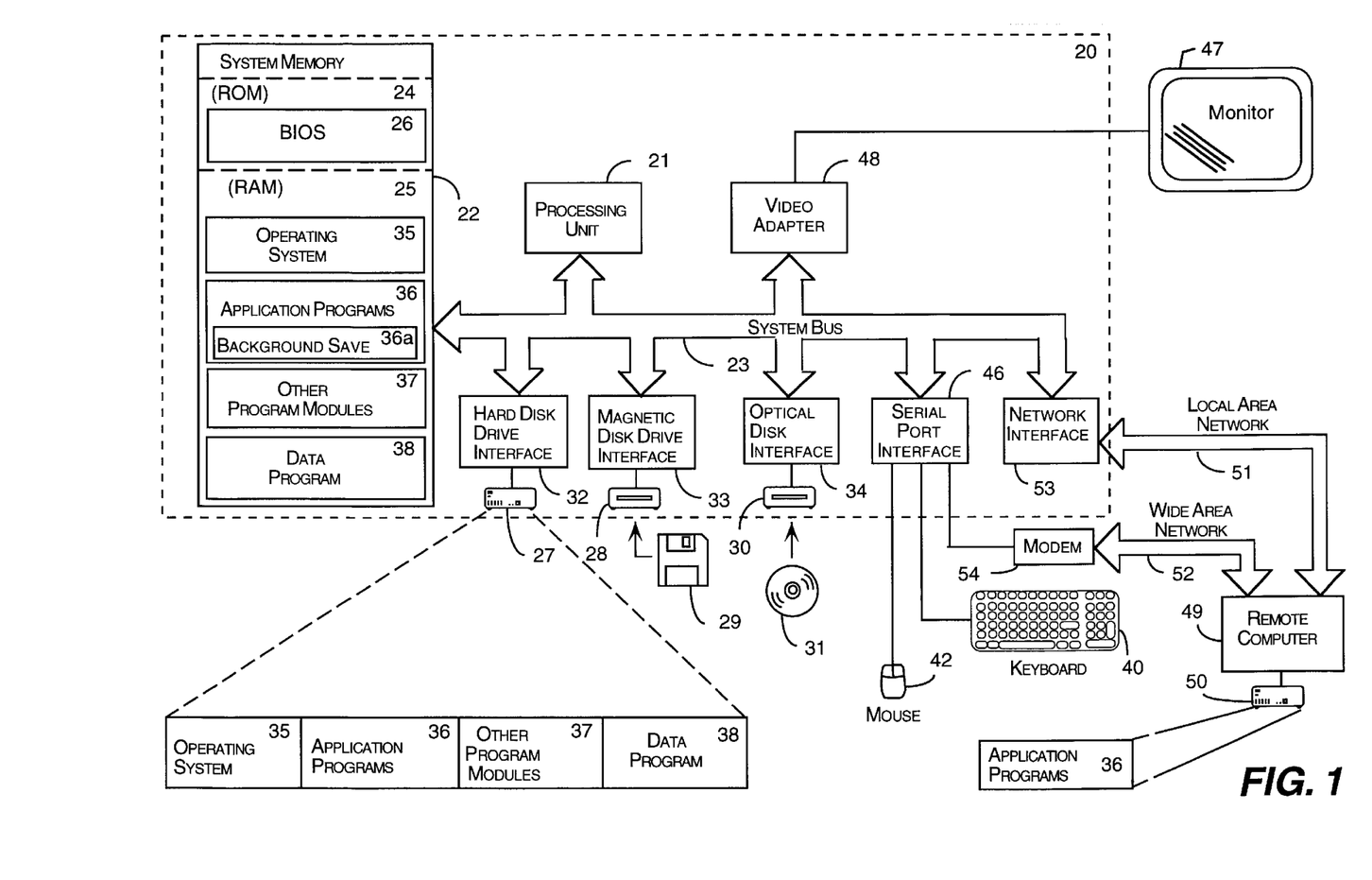
FIG. 1 is a block diagram of a personal computer illustrating the operating environment for an embodiment of the present invention.

FIG. 1 and the following discussion are intended to provide a brief, general description of a suitable computing environment in which the invention may be implemented. While the invention will be described in the general context of an application program that runs on an operating system in conjunction with a personal computer, those skilled in the art will recognize that the invention also may be implemented in combination with other program modules. Generally, program modules include routines, programs, components, data structures, etc. that perform particular tasks or implement particular abstract data types. Moreover, those skilled in the art will appreciate that the invention may be practiced with other computer system configurations, including hand-held devices, multiprocessor systems, microprocessor-based or programmable consumer electronics, minicomputers, mainframe computers, and the like. The invention may also be practiced in distributed computing environments where tasks are performed by remote processing devices that are linked through a communications network. In a distributed computing environment, program modules may be located in both local and remote memory storage devices.

With reference to FIG. 1, an exemplary system for implementing the invention includes a conventional personal computer 20, including a processing unit 21, a system memory 22, and a system bus 23 that couples the system memory to the processing unit 21. The system memory 22 includes read only memory (ROM) 24 and random access memory (RAM) 25. A basic input/output system 26 (BIOS), containing the basic routines that help to transfer information between elements within the personal computer 20, such as during start-up, is stored in ROM 24. The personal computer 20 further includes a hard disk drive 27, a magnetic disk drive 28, e.g., to read from or write to a removable disk 29, and an optical disk drive 30, e.g., for reading a CD-ROM disk 31 or to read from or write to other optical media. The hard disk drive 27, magnetic disk drive 28, and optical disk drive 30 are connected to the system bus 23 by a hard disk drive interface 32, a magnetic disk drive interface 33, and an optical drive interface 34, respectively. The drives and their associated computer-readable media provide nonvolatile storage for the personal computer 20. Although the description of computer-readable media above refers to a hard disk, a removable magnetic disk and a CD-ROM disk, it should be appreciated by those skilled in the art that other types of media which are readable by a computer, such as magnetic cassettes, flash memory cards, digital video disks, Bernoulli cartridges, and the like, may also be used in the exemplary operating environment.

A number of program modules may be stored in the drives and RAM 25, including an operating system 35, one or more application programs 36, including an application program implementing background save 36a, other program modules 37, and program data 38. A user may enter commands and information into the personal computer 20 through a keyboard 40 and pointing device, such as a mouse 42. Other input devices (not shown) may include a microphone, joystick, game pad, satellite dish, scanner, or the like. These and other input devices are often connected to the processing unit 21 through a serial port interface 46 that is coupled to the system bus, but may be connected by other interfaces, such as a game port or a universal serial bus (USB). A monitor 47 or other type of display device is also connected to the system bus 23 via an interface, such as a video adapter 48. In addition to the monitor, personal computers typically include other peripheral output devices (not shown), such as speakers or printers.

The personal computer 20 may operate in a networked environment using logical connections to one or more remote computers, such as a remote computer 49. The remote computer 49 may be a server, a router, a peer device or other common network node, and typically includes many or all of the elements described relative to the personal computer 20, although only a memory storage device 50 has been illustrated in FIG. 1. The logical connections depicted in FIG. 1 include a local area network (LAN) 51 and a wide area network (WAN) 52. Such networking environments are commonplace in offices, enterprise-wide computer networks, intranets and the Internet.

When used in a LAN networking environment, the personal computer 20 is connected to the LAN 51 through a network interface 53. When used in a WAN networking environment, the personal computer 20 typically includes a modem 54 or other means for establishing communications over the WAN 52, such as the Internet. The modem 54, which may be internal or external, is connected to the system bus 23 via the serial port interface 46. In a networked environment, program modules depicted relative to the personal computer 20, or portions thereof, may be stored in the remote memory storage device. It will be appreciated that the network connections shown are exemplary and other means of establishing a communications link between the computers may be used.

Foreground Save

To open a document in a word processing application program such as the "WORD" word processing program, only the document descriptor, the document header and the first couple pages of text are loaded into memory. The remaining pages of text remain on disk. The document descriptor is used to load the remaining pages of text as required. The document descriptor is a data structure, defined by the word processing program, which contains a list of references or pointers to the document data stored on disk. Document data includes document text and document properties. For example, a document descriptor may contain a pointer to a location on disk which contains a portion of the document text.

A document may be saved as a full foreground save. A full foreground save copies the entire document into a temporary file using the document descriptor. The document text and document properties pointed to by the document descriptor are read from disk and written into the temporary file. After the document text and document properties are copied to the temporary file, the temporary file is renamed. If the save was initiated by a "save" command, then the temporary file is renamed to the document name. If the save was initiated by a "save as" command, then the temporary file is renamed to the document name specified by the "save as" command. During a full foreground save, all editing is suspended until the save is complete.

In addition to a full foreground save, a document may also be saved as an incremental foreground save. An incremental foreground save typically occurs in connection with an automatic save. The first automatic save is a full foreground save. The entire document is copied into an automatic save file following the procedure described above in connection with a full foreground save. Subsequent automatic saves are incremental saves which append changes to the document since the last automatic save to the end of the automatic save file. For an incremental save, the document descriptor for the document is compared to the document descriptor for the automatic save file. If the document descriptor for the document contains pointers which are not contained in the document descriptor for the automatic save file, then the new pointers are appended to the end of the document descriptor for the automatic save file and the new document text and document properties are copied to the end of the automatic save file. Editing is also suspended during an incremental foreground save.

Background Save

One embodiment of the present invention may be used in a word processing program to save a document in a background save thread while a user continues to edit the document in a foreground thread. This embodiment is referred to herein as a background save. A background save may be used for both command-initiated saves and automatic saves. A command-initiated save is a save initiated by the user via the "save" command or the "save as" command. An automatic save is a save initiated without user intervention. Typically, an automatic save is periodically initiated by the word processing program.

Editing is not totally suspended during a background save as it is for a foreground save. A background save utilizes the document descriptor to minimize the interruption caused by a document save. A background save clones or copies the document descriptor before copying the document into a temporary file. Because the document descriptor is significantly smaller than the document, cloning the document descriptor takes considerably less time than copying the document. A background save only interrupts editing for the time required to clone the document descriptor. Therefore, the user experiences a shorter interruption for a background save than for a foreground save.

When a background save is initiated, the foreground thread clones the document descriptor for the document. Once the document descriptor is cloned, if a foreground event, such as a keystroke, has been detected, then editing continues in the foreground thread. If no foreground event has been detected, then control is transferred to the background save thread and the save continues. During the save, the background save thread checks for a foreground event. If a foreground event is detected, then control is returned to the foreground thread. Control is transferred between the foreground thread and the background save thread until the background save is complete.

Figure 2:
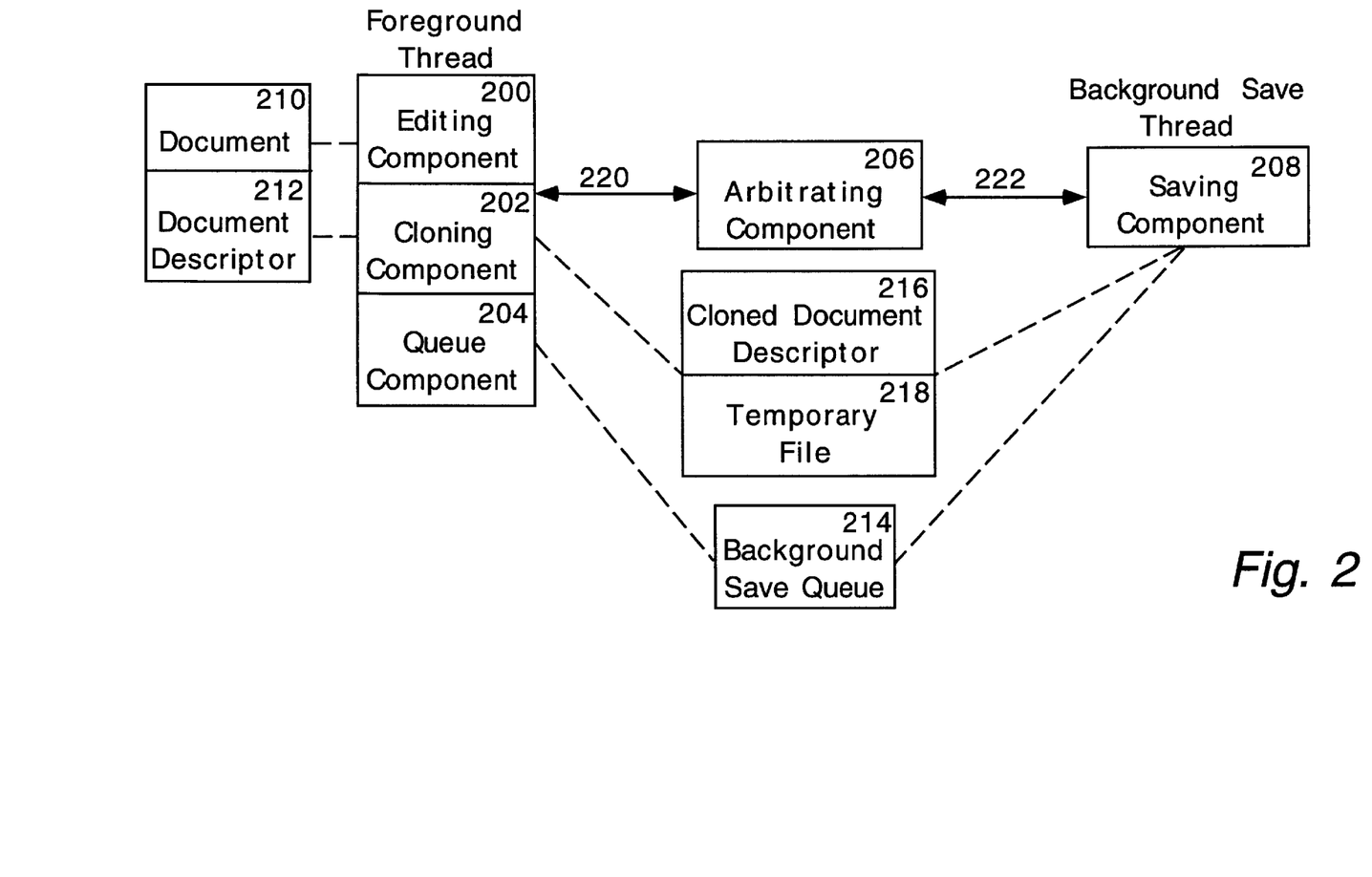
FIG. 2 is a block diagram illustrating components of a foreground thread and a background save thread for an embodiment of the present invention.

FIG. 2 illustrates the basic components of an editing system implementing background save. The foreground thread includes an editing component 200, a cloning component 202, and a queue component 204. The user creates or revises a document using the editing component 200. The cloning component 202 clones a copy of the document descriptor 212 for the document 210. The queue component 204 maintains a list of pending background saves in a background save queue 214. The background save thread includes a saving component 208. The saving component 208 saves a copy of the document. The foreground thread components and the background save thread component interface via the arbitrating component 206.

The editing component may be used to edit a document 210. When a background save is initiated, control passes from the editing component 200 to the cloning component 202. The cloning component 202 clones the document descriptor 212 by creating a copy of the document descriptor 216 in memory. The cloning component 202 also creates a temporary file 218. After the document descriptor 212 is cloned and the temporary file 218 is created, control is passed to the queue component 204.

The queue component 204 maintains a background save queue 214. The background save queue 214 contains entries for pending background saves. An entry for a pending background save typically includes the saved document name and a save type field. The save type field indicates whether the background save is a command-initiated save or an automatic save. In one embodiment, the background save queue is organized as a FIFO (first in, first out) queue. A new entry is added to the background save queue whenever a background save is detected. Once a background save is completed, the entry corresponding to the background save is deleted from the background save queue.

When a background save is initiated, the current background save is compared to the pending background save entries in the background save queue. If the document name corresponding to the current background save matches the document name corresponding to a pending background save entry, then the existing background save entry is deleted from the background save queue, unless an exception applies.

An exception may apply if the background save for the pending background save entry is in progress. If the background save for the pending background save entry is in progress, then a flag is set to terminate the background save. The background save entry is not deleted until the background save is terminated. An exception may also apply if the background save corresponds to an automatic save and the pending background save entry corresponds to a command-initiated save. If the background save corresponds to an automatic save and the pending background save entry corresponds to a command-initiated save, then the existing background save entry is not deleted.

The saving component 208 uses the cloned document descriptor 216 to copy the document into the temporary file 218. The saving component 208 uses the pointers contained in the cloned document descriptor 216 to locate document text and document properties on disk. Once the document text and document properties are located, then the saving component 208 reads the document text and document properties from disk and writes the document text and document properties to the temporary file 218.

The arbitrating component 206 transfers control between the foreground thread and the background save thread. During a background save, the arbitrating component 206 monitors the foreground thread and if a foreground event is detected, then the arbitrating component 206 instructs the saving component 208 to temporarily suspend the background save and transfers control to the foreground thread. When the foreground thread is idle, the arbitrating component 206 returns control to the background save thread so that the background save may continue. The arbitrating component 206 continues to transfer control between the foreground thread and the background save thread until the background save is complete. The arbitrating component 206 controls the foreground thread components via a set of foreground control signals 220. Similarly, the arbitrating component 206 controls the background save thread component using a set of background control signals 222.

Figure 3:
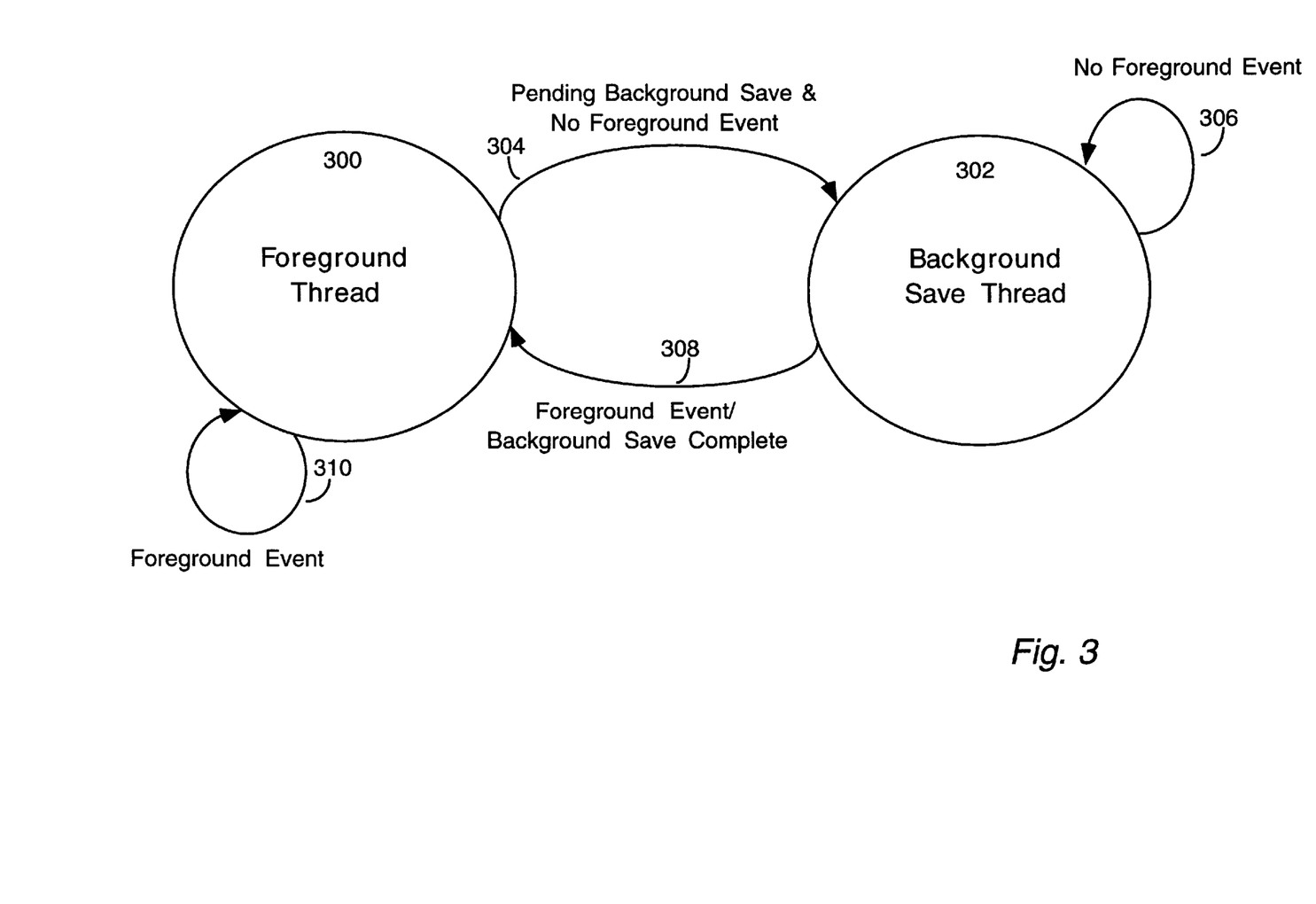
FIG. 3 is a state diagram illustrating the transfer of control between a foreground thread and a background save thread for an embodiment of the present invention.

The transfer of control between the foreground thread and the background save thread is further illustrated by the state diagram of FIG. 3. In FIG. 3, document editing proceeds in the foreground thread 300 until a background save is initiated. A background save may be initiated by a "save" or "save as" command or may be automatically initiated by the word processing program. Once a background save is initiated, the foreground thread 300 clones the document descriptor for the document being saved, creates an entry in the background save queue, and creates a temporary file. If no foreground event is detected, then control is transferred from the foreground thread 300 to the background save thread 302 via path 304. The background save proceeds in the background save thread 302 as long as the background save thread 302 retains control, as illustrated by path 306 which loops back to the background save thread 302.

Once the background save is complete, control is returned to the foreground thread 300 via path 308. If a foreground event is detected before a background save is completed, then path 308 is followed from the background save thread 302 to the foreground thread 300. The foreground thread 300 retains control until the foreground thread 300 is idle, as illustrated by path 310 which loops back to the foreground thread 300. If the foreground thread is idle, then control is transferred from the foreground thread 300 to the background save thread 302 via path 304 and the background save continues.

Figure 4:
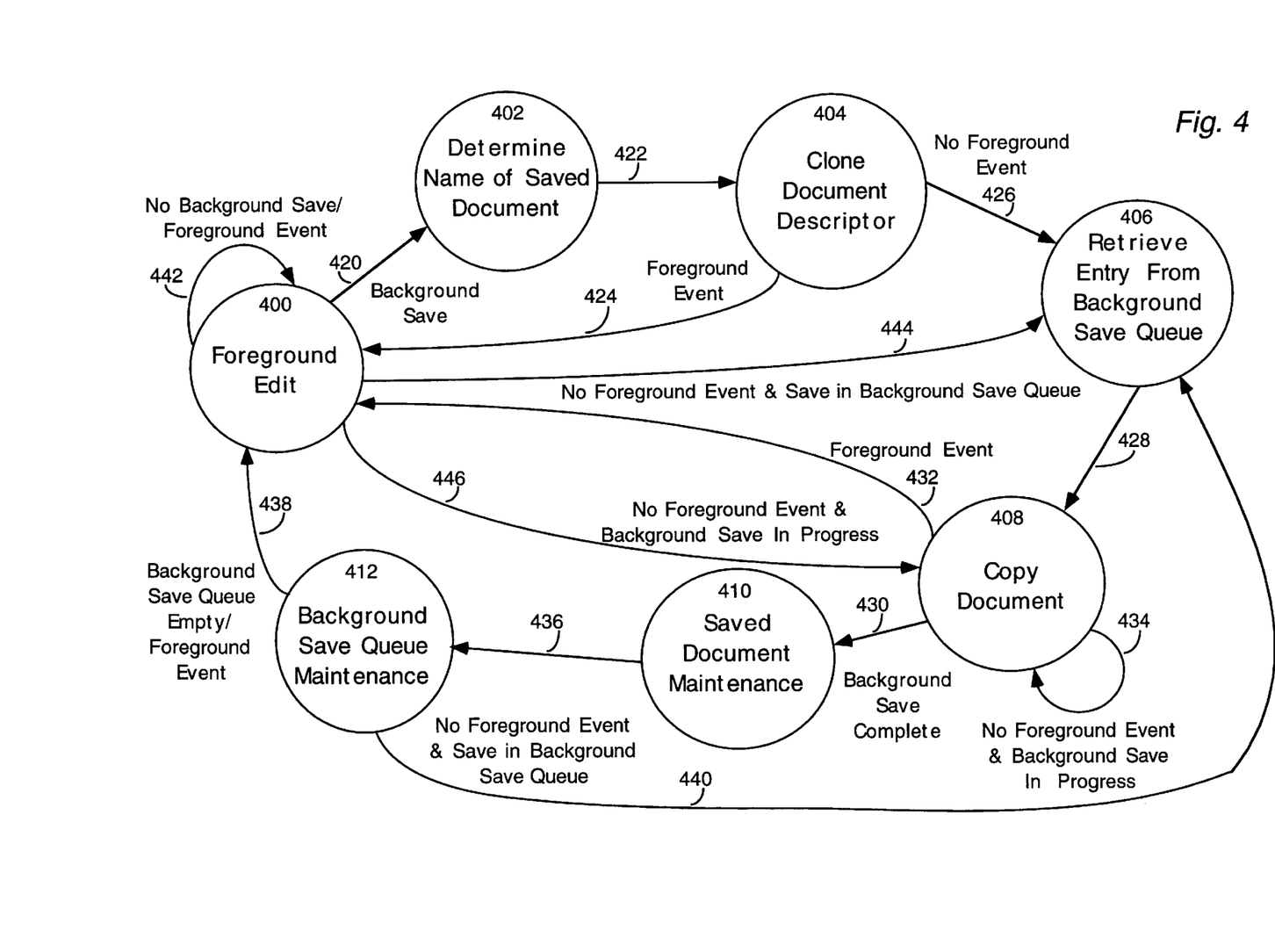
FIG. 4 is a state diagram further illustrating the transfer of control between a foreground thread and a background save thread for an embodiment of the present invention.

FIG. 4 further illustrates the states for performing a background save. In FIG. 4, the foreground thread corresponds to states 400, 402, 404, 410 and 412 and the background save thread corresponds to states 406 and 408. Document editing is performed in the foreground thread in state 400. Once a background save is initiated, a state transition occurs from state 400 to state 402 via path 420. In state 402, the foreground thread determines the saved document name. If the background save was initiated by a "save" command, then the saved document name corresponds to the name of the document. If the background save was initiated by a "save as" command, then the saved document name corresponds to the name specified by the "save as" command. If the background save was initiated by an automatic save, then the saved document name is the name of the automatic save file. Once the name of the saved document is determined, then path 422 is followed to state 404.

In state 404, the document descriptor for the document is cloned. The cloned document descriptor is a bit-wise copy of the original document descriptor. The cloned document descriptor is stored in a data structure in memory. The data structure may also contain additional information for the save. A temporary file is also created in state 404.

In addition, the saved document name is compared to the entries in the background save queue in state 404. If the saved document name matches an entry in the background save queue, then the entry may be deleted. The entry is deleted unless the entry corresponds to a background save which is in progress or the background save was initiated by an automatic save and the entry corresponds to a command-initiated background save. After the saved document name is compared to the entries in the background save queue, a new entry for the saved document is created and is added to the background save queue.

During states 402 and 404, the foreground thread is monitored to detect the occurrence of a foreground event, such as a keystroke. If a foreground event is detected, then control is retained by the foreground thread and path 424 is followed to the foreground edit state 400. By checking for a foreground event in states 402 and 404, editing may resume after only a short interruption. The interruption is only as long as required to clone the document descriptor, create a temporary file, and create an entry in the background save queue.

If a foreground event is detected during state 402 or state 404, then path 424 is followed to state 400 and document editing may resume. So long as the foreground thread is active, path 442 loops back to state 400 and the background save is suspended. Once the foreground thread becomes idle, then path 444 transfers control to state 406 and the background save continues in the background save thread.

If a foreground event is not pending, then control is transferred from the foreground thread to the background save thread and path 426 is followed to state 406. In state 406, an entry is retrieved from the background save queue. Typically, the background save queue is organized as a FIFO queue. The background save corresponding to the retrieved entry may be already in progress or may be waiting to be initiated. The retrieved entry is not necessarily the entry created in state 404. Once an entry is retrieved from the background save queue, path 428 is followed to state 408. In state 408, the document is copied into the temporary file. The cloned document descriptor is used to copy the document. The pointers in the document descriptor are used to locate document text and document properties on disk. The document text and document properties are read from disk and written to the temporary file. The document text and document properties may be assembled into a page before being written to the temporary file.

During states 406 and 408, the foreground thread is monitored to detect foreground events. So long as the background save is in progress and no foreground event occurs, path 434 loops back to state 408. If a foreground event is detected, then path 432 is followed back to state 400 and control is returned to the foreground thread. There may be a slight delay between detecting a foreground event and returning control to the foreground thread. For example, if a foreground event is detected while document data is being assembled into a page, then control may not be returned to the foreground thread until after the page is written to the temporary file. The state transition may be delayed until after the write to the page buffer is complete to insure that a disk write is not interrupted.

Once the document is copied into the temporary file, path 430 is followed to state 410 and control is returned to the foreground thread. Saved document maintenance is performed in state 410. Saved document maintenance may include renaming the temporary file to the saved document name determined in state 402. Saved document maintenance may also include copying information from the cloned document descriptor to the original document descriptor. The temporary file is renamed to the saved document name and the document descriptor information is copied if the document has not been edited since the background save was initiated. Once the saved document maintenance is complete, path 436 is followed to state 412.

Background save queue maintenance is performed in state 412. In state 412, the entry for the completed background save is deleted from the background save queue. In addition, a determination is made as to whether the background save queue is empty. If the background save queue is empty or if there is a pending foreground event, then path 438 is followed to the foreground edit state 400. If the background save queue is not empty and if there is no pending foreground event, then path 440 is followed to state 406 and another entry is retrieved from the background save queue by the background save thread.

If a foreground event is detected during a background save, then control is returned to the foreground thread. For example, if a foreground event is detected in state 408, then path 432 is followed from state 408 to state 400. Control is retained by the foreground thread as long as the foreground thread is active. Path 442 continues to loop back to state 400 until the foreground thread is idle. Once the foreground thread is idle, control is returned to the background save thread. For example, if control is returned to the foreground thread via path 432, then path 446 is followed to state 408 once the foreground thread becomes idle.

A background save thread may be created for each background save. For example, a background save thread may be spawned when the first background save is detected and may be terminated after the first background save is completed, assuming there are no pending background saves. If a background save thread is created for each background save, then a background save thread is spawned in state 402 and the background save thread is terminated in state 412. In this implementation, multiple background save threads may be spawned and terminated during a single word processing session. Alternatively, a single background save thread may be spawned when the first background save is detected and then terminated when the word processing program is exited. If a single background save thread is created, then a background save thread is spawned the first time state 400 transitions to state 402.

Error Handling

If an error occurs during a background save, then the background save may be converted into a foreground save and completed in the foreground thread. Alternatively, the background save may be aborted. The background save thread may distinguish between command-initiated saves and automatic saves when handling an error. If an error occurs during a command-initiated background save, then the background save thread may convert the background save to a foreground save. However, the background save thread may abort an automatic background save. An automatic save may be aborted rather than converted to a foreground save because a subsequent automatic save is likely to occur.

Although the present invention has been described using cooperative threading between the foreground thread and the background save thread, the present invention may also be implemented using free-threading. Free-threading transfers control between the foreground thread and the background save thread based upon time slices or time intervals. At the end of each time slice, control is transferred to a different thread.

In the cooperative threading implementation discussed above, the background save thread suspends a background save while the foreground thread processes a foreground event. In contrast, in the free-threading implementation, the background save thread continues a background save while the foreground thread processes a foreground event using spare cycles from the foreground thread.

In the free threading implementation, the arbitrating component 206 of FIG. 2 resides in the operating system. A multitasking operation system, such as the "WINDOWS NT" or "WINDOWS 95" operating system, includes a processor scheduler that switches between the active threads in the system. The operating system transfers control between the foreground thread and the background save thread using hardware interrupts. The foreground control signals 220 and the background control signals 222 of FIG. 2 include these interrupt signals. In FIGS. 3 and 4, the transfers of control between the foreground thread and the background save thread occur at the end of a time slice in the free threading implementation.

In summary, the present invention is directed toward a method for saving a document in a background thread while continuing to edit the document in the foreground thread. The document is saved by cloning the document descriptor for the document and then copying the document data into a temporary file. Alternative embodiments will become apparent to those skilled in the art to which the present invention pertains without departing from its spirit and scope. Accordingly, the scope of the present invention is described by the appended claims and is supported by the foregoing description.

What is claimed is:

1. A method for saving a document in a background save thread while editing the document in a foreground thread, comprising the steps of:

detecting a background save;

checking whether a foreground event has occurred; and if the foreground event has not occurred, then transferring control to the background save thread and saving the document in the background save thread.

2. The method of claim 1, wherein the background save is an automatic save of the document initiated by a word processing program.

3. The method of claim 1, wherein the background save is a command-initiated save of the document.

4. The method of claim 1, further comprising the step of cloning a document descriptor for the document, the document descriptor having a list of pointers pointing to data of the document.

5. The method of claim 4, wherein the step of saving the document in the background save thread comprises:

copying the document into a temporary file using the cloned document descriptor.

6. The method of claim 1, wherein the step of saving the document in the background save thread comprises:

checking whether the foreground event has occurred; and if the foreground event has occurred, then transferring to the foreground thread.

7. The method of claim 1, further comprising the steps of:

comparing the background save to a selected one of a plurality of entries maintained in a background save queue, the entries corresponding to pending background saves; and if the background save matches the selected entry and if the background save corresponds to a command-initiated save, then deleting the selected entry from the background save queue.

8. The method of claim 1, further comprising the steps of:

comparing the background save to a selected one of a plurality of entries maintained in a background save queue, the entries corresponding to pending background saves; and if the background save matches the selected entry and if the background save and the selected entry both correspond to automatic saves, then deleting the selected entry from the background save queue.

9. The method of claim 8, comprising the step of:

creating a background save entry for the background save, the background save entry including a document name field and a save type field, the save type field indicating whether the selected entry corresponds to an automatic save or to a command-initiated save; and adding the background save entry to the background save queue.

10. A computer-readable medium having computer-executable instructions comprising:

a foreground thread having:

an editing component for editing a document and for detecting a background save of the document;

a cloning component for cloning a document descriptor for the document, in response to the editing component detecting the background save; and a queue component for maintaining a background save queue having a plurality of entries for pending background saves, and for comparing the background save to a selected one of the entries; and a background save thread having a saving component for saving the document using the cloned document descriptor.

11. The computer-readable medium of claim 10, having further computer executable instructions comprising:

an arbitrating component for arbitrating between the foreground thread and the background save thread.

12. The computer-readable medium of claim 11, wherein the arbitrating component has further computer-executable instructions comprising:

if a foreground event is detected while the saving component is saving the document, then transferring control from the saving component to the editing component.

13. The computer-readable medium of claim 12, wherein the arbitrating component has further computer-executable instructions comprising:

if the editing component becomes idle, then transferring control from the editing component to the saving component.

14. The computer-readable medium of claim 10, wherein the cloning component has further computer-executable instructions comprising creating a temporary file.

15. The computer-readable medium of claim 10, wherein the document descriptor comprises pointers to document text and document properties for the document.

16. The computer-readable medium of claim 10, wherein the queue component has computer-executable instructions comprising:

if the background save matches the selected entry, and if the background save corresponds to a command-initiated save, then deleting the selected entry from the background save queue.

17. The computer-readable medium of claim 10, wherein the queue component has computer-executable instructions comprising:

if the background save matches the selected entry, and if the background save and the selected entry both correspond to automatic saves, then deleting the selected entry from the background save queue.

18. The computer-readable medium of claim 10, wherein the queue component has computer-executable instructions comprising:

adding a background save entry to the background save queue for the background save.

19. A computer-readable medium having computer-executable instructions comprising the steps of:

retrieving a selected one of a plurality of entries maintained in a background save queue, the selected entry corresponding to a pending background save for a selected document; and copying the selected document into a temporary file.

20. The computer-readable medium of claim 19, having further computer-executable instructions comprising:

cloning the document descriptor; and using the cloned document descriptor to copy the selected document into the temporary file.

21. The computer-readable medium of claim 19, wherein the selected entry comprises a document name field and a save type field, and wherein the save type field indicates whether the selected entry corresponds to an automatic save of the selected document or to a command-initiated save of the selected document.

22. The computer-readable medium of claim 19, wherein the step of copying the selected document into a temporary file occurs in a background save thread.

23. The computer-readable medium of claim 22, having further computer-executable instructions comprising:

detecting a foreground event, and in response, transferring control from the background save thread to a foreground thread.

* * * * *